US009132956B2

(12) United States Patent
Wilcoxen et al.

(10) Patent No.: US 9,132,956 B2
(45) Date of Patent: Sep. 15, 2015

(54) CLING WRAP

(71) Applicant: The Glad Products Company, Oakland, CA (US)

(72) Inventors: Kyle R. Wilcoxen, Chicago, IL (US); Robert T. Dorsey, Western Springs, IL (US); Jason R. Maxwell, Elgin, IL (US)

(73) Assignee: The Glad Products Company, Oakland, CA (US)

( * ) Notice: Subject to any disclaimer, the term of this patent is extended or adjusted under 35 U.S.C. 154(b) by 40 days.

(21) Appl. No.: 13/760,921

(22) Filed: Feb. 6, 2013

(65) Prior Publication Data

US 2013/0140207 A1 Jun. 6, 2013

Related U.S. Application Data

(63) Continuation-in-part of application No. 12/843,722, filed on Jul. 26, 2010, now abandoned.

(60) Provisional application No. 61/365,412, filed on Jul. 19, 2010.

(51) Int. Cl.
| | | |
|---|---|---|
| *B26F 3/02* | (2006.01) | |
| *B65H 35/10* | (2006.01) | |
| *B29D 22/00* | (2006.01) | |
| *B29D 23/00* | (2006.01) | |
| *B32B 1/08* | (2006.01) | |
| *B65D 85/67* | (2006.01) | |
| *B65D 83/08* | (2006.01) | |
| *B32B 27/08* | (2006.01) | |
| *B32B 27/32* | (2006.01) | |
| *B32B 3/28* | (2006.01) | |
| *C08J 5/18* | (2006.01) | |

(52) U.S. Cl.
CPC . *B65D 85/67* (2013.01); *B32B 3/28* (2013.01); *B32B 27/08* (2013.01); *B32B 27/32* (2013.01); *B65D 83/0882* (2013.01); *C08J 5/18* (2013.01); *B32B 2250/02* (2013.01); *B32B 2250/242* (2013.01); *B32B 2255/10* (2013.01); *B32B 2255/26* (2013.01); *B32B 2307/5825* (2013.01); *B32B 2307/746* (2013.01); *B32B 2307/748* (2013.01); *B32B 2439/70* (2013.01); *B32B 2553/00* (2013.01); *C08J 2323/06* (2013.01); *C08J 2323/08* (2013.01)

(58) Field of Classification Search
CPC ....... B65D 85/67; B65D 83/0882; C08J 5/18; C08J 2323/06; C08J 2323/08; B32B 27/08; B32B 27/32; B32B 3/28; B32B 2307/746; B32B 2439/70; B32B 2307/748; B32B 2250/02; B32B 2307/5825; B32B 2255/10
USPC ........... 225/39, 43, 49, 56–58; 428/167, 34.1, 428/910, 212, 323, 34.2, 35.7, 36.91, 906
See application file for complete search history.

(56) References Cited

U.S. PATENT DOCUMENTS 1,991,812 A * 2/1935 Marcalus ......................... 225/43
2,565,491 A * 8/1951 Francis, Jr. .................... 428/152

(Continued)

*Primary Examiner* — Ghassem Alie
*Assistant Examiner* — Bharat C Patel
(74) *Attorney, Agent, or Firm* — Thomas C. Feix

(57) ABSTRACT

A thermoplastic food wrap film including a plurality of parallel ribs formed therein. To produce the film, a thermoplastic web may be directed between opposing first and second rollers having ridges. The formation of the ribs may increase the width of the web. The film may be formed into a roll and inserted into a box having a cutting strip.

20 Claims, 5 Drawing Sheets

(56) References Cited

U.S. PATENT DOCUMENTS

| | | | |
|---|---|---|---|
| 3,028,060 A * | 4/1962 | Haley | 225/53 |
| 3,229,876 A * | 1/1966 | Osborn, Jr. | 225/49 |
| 3,496,281 A * | 2/1970 | McMahon | 174/29 |
| 3,509,005 A * | 4/1970 | Hartig | 428/34.2 |
| 3,748,214 A * | 7/1973 | Whithers | 428/166 |
| 4,076,121 A * | 2/1978 | Clayton et al. | 206/390 |
| 4,367,256 A * | 1/1983 | Biel | 428/218 |
| 4,426,029 A * | 1/1984 | Kamp | 225/49 |
| 4,474,318 A * | 10/1984 | Perrin | 225/50 |
| 4,666,072 A * | 5/1987 | McCarter | 225/25 |
| 4,967,911 A * | 11/1990 | Lo Duca | 225/49 |
| 5,009,351 A * | 4/1991 | Handler | 225/52 |
| 5,031,813 A * | 7/1991 | Broughton | 225/49 |
| 5,082,159 A * | 1/1992 | Gutierrez | 225/34 |
| 5,135,784 A * | 8/1992 | Okumura | 428/34.2 |
| 5,204,142 A * | 4/1993 | Okumura | 427/285 |
| 5,423,464 A * | 6/1995 | Yuki et al. | 225/43 |
| 5,518,801 A * | 5/1996 | Chappell et al. | 428/152 |
| 5,617,707 A * | 4/1997 | Simmons | 53/441 |
| 6,375,058 B1 * | 4/2002 | Passamoni | 225/49 |
| 6,405,913 B1 * | 6/2002 | Passamoni | 225/43 |
| 6,500,901 B2 * | 12/2002 | Somers | 525/240 |
| 6,585,138 B2 * | 7/2003 | Takayama | 225/41 |
| 6,682,808 B2 * | 1/2004 | Kobayashi et al. | 428/213 |
| 6,956,088 B2 * | 10/2005 | Farley et al. | 526/113 |
| 7,803,244 B2 * | 9/2010 | Siqueira et al. | 156/229 |
| 7,808,163 B2 * | 10/2010 | Benslimane et al. | 310/365 |
| 2002/0061975 A1 * | 5/2002 | Perdomi et al. | 525/240 |
| 2003/0132262 A1 * | 7/2003 | Takayama | 225/43 |
| 2003/0211270 A1 * | 11/2003 | McReynolds et al. | 428/40.1 |
| 2007/0090144 A1 * | 4/2007 | Kazama | 225/43 |
| 2008/0014410 A1 * | 1/2008 | Johnston et al. | 428/141 |
| 2009/0022927 A1 * | 1/2009 | Strobel et al. | 428/43 |
| 2009/0155540 A1 * | 6/2009 | Merrill et al. | 428/172 |
| 2009/0239039 A1 * | 9/2009 | Benslimane et al. | 428/161 |

* cited by examiner

CLING WRAP

CROSS REFERENCE TO RELATED APPLICATIONS

This application is a continuation-in-part and claims the benefit of U.S. application Ser. No. 12/843,722, filed Jul. 26, 2010, which claims the benefit of U.S. Provisional Application No. 61/365,412, filed Jul. 19, 2010, both of which are hereby incorporated by reference in their entirety.

FIELD OF THE INVENTION

This invention relates to flexible films that can be used to package food.

BACKGROUND

Flexible films for use as food wraps have been developed and improved over time. Such food wraps are typically called food grade wrap films. There are many criteria that consumers require in a flexible food grade wrap film. First, it is important for the film to be strong and yet easily torn when brought in contact with a cutter bar as found in the standard containers used for containing and dispensing flexible food grade wrap film. Second, it is important for the film to be flexible so that it molds easily around a container or object to be covered or wrapped. Third, the film must be somewhat tacky to seal around the container or object, but at the same time not be so tacky that it will too aggressively stick to itself, making the film difficult to unwind from a roll due to "blocking", or too unruly making it difficult to place the film at a desired location during use.

For general background, U.S. Pat. No. 5,399,426 to Koch, et al. discloses monolayer and multilayer film structures having at least one layer of a polymer blend comprising at least one branched polymer (e.g., low density polyethylene (LDPE) or ethylene/vinyl acetate copolymer (EVA)) and at least one linear polyethylene (e.g., LLDPE). The film structures are described as having a good overall balance of properties, including high ultimate elongation, excellent load retention and good machine direction tear. However, no mention is made of any particular feature in the film that addresses the concern that the film not be so tacky that it will easily stick to itself, causing "blocking" when wound or preventing easy placement of the film in a desired location. U.S. Pat. No. 5,948,493 to attempts to solve this problem with a plastic wrap that exhibits little or no cling until such time as it is applied to an article or other target surface. An adhesive layer formed on one side of the sheet of olefinic polymer is exposed to a treatment that superficially oxidizes or cross-links the outer layer of the adhesive material to form a film that exhibits greatly attenuated adhesion. This cross-linked outer layer is disruptable as the wrap is applied and stretched or otherwise deformed in a manner that uncovers the adhesive material and endows cling properties on at least localized areas of the wrap.

We have discovered an alternative, simpler, cost-effective structure for a food grade film wrap (and a method for making it) containing a textured structure in combination with other film features, that is flexible, transparent, translucent or opaque, strong yet easily torn off from the roll using a cutter bar, and that is sufficiently tacky to seal around a container or object but not too tacky to cause "blocking". The method of making such a film is efficient from a production standpoint, allowing the extrusion of a thicker film gauge; cost-effective, allowing a final thinner film gauge; and having a consumer perceivable texture.

BRIEF SUMMARY

In one embodiment, the invention comprises a container comprising an oblong carton having a lengthwise opening and a lengthwise cutting strip; and a roll of thermoplastic food wrap film on a paper core, the film having a plurality of ribs parallel to one another along the length of the film; wherein as the film is removed from the carton, the parallel ribs are in perpendicular alignment with the cutting strip.

In another embodiment, the invention comprises a cling wrap film, wherein the film has a gauge from about 0.3 mils to about 1.5 mils, parallel ribs having a height from about 0.025 cm to about 0.127 cm, and a ratio of MD tear to TD tear of greater than 2.0.

In another embodiment, the invention comprises a container comprises an oblong carton having a lengthwise opening and a lengthwise cutting strip; and a roll of thermoplastic food wrap film on a paper core, the film having a width along the lengthwise opening of the carton and a film length perpendicular to the film width, the film having a plurality of parallel ribs extending along film length, wherein the ribs form an alternating pattern of first ribs having a first width and second ribs having a second width, where the first width is different that the second width.

In another embodiment, the container comprises an oblong carton having a lengthwise opening and a lengthwise cutting strip; and a roll of thermoplastic food wrap film on a paper core, the film having a width along the lengthwise opening of the carton and a film length perpendicular to the film width, the film having a pattern of a plurality of parallel ribs extending along film length, wherein the pattern extends across the entire film width, wherein the film has a front side and a back side and the first ribs and second ribs extend from both the front side and the back side.

In another embodiment, the container comprises an oblong carton having a lengthwise opening and a lengthwise cutting strip; and a roll of thermoplastic food wrap film on a paper core, the film having a width along the lengthwise opening of the carton and a film length perpendicular to the film width, the film having a plurality of parallel ribs extending along film length, wherein the ribs form an alternating pattern of first ribs having a first width and second ribs having a second width, where the first width more than twice as long as the second width.

In another embodiment, the invention comprises a container comprising a rectangular carton with a front panel, a bottom panel, a back panel, two side panels and a lid, the carton having a lengthwise opening and a lengthwise cutting strip; and a roll of thermoplastic film on a paper core, the film having a plurality of ribs parallel to one and parallel to the film side edges; wherein as the film is removed from the carton, the parallel ribs are in perpendicular alignment with the cutting strip.

In another embodiment, the invention comprises a method of forming a container for thermoplastic food wrap film comprising extruding a film by a method from the group consisting of cast film extrusion and blown film extrusion to produce a film having an initial width between a first edge and a second edge and an initial thickness gauge; advancing the film through a set of first and second rollers rotating in opposite direction, the rollers arranged adjacent to each other, the surface of the first and second roller including a plurality of ridges protruding radially outward, the ridges arranged parallel to and axially spaced from one another; plastically stretching the film between the set of first and second rollers so that the overall width of the film increases, wherein the plastically stretched portions of the film form ribs parallel to the machine direction; and rolling the ribbed, plastically stretched film into a roll and inserting into a oblong rectangular box having a cutting strip, such that when the film is removed from the box, the parallel ribs are in perpendicular alignment with the cutting strip.

In another aspect, the improved cling wrap may have an initially planar web of pliable thermoplastic material that is directed in between rotating rollers. As the web is directed between the rollers, the inter-fitting ridges of the first and second rollers may distort and stretch the web. In particular, the first segments of the first ridges may stretch the web material between the ridges on the second roller to form a plurality of ribs in the web that correspond to a segment height. The stretching of the ribs may plastically set the thermoplastic material so as to result in increasing the overall area of the web available to form the finished wrap.

In order to make a cost effective film, the film must have as low a gauge as possible, to reduce material costs, while still providing appropriate tear resistance, blocking, and consumer acceptable feel. This combination of properties has been most suitably achieved in the past using low density polyethylene (LDPE) with a cast film process, if gauge control was desired, or with blown film process, if higher tear resistance was desired.

In an embodiment of the invention, the film is first extruded in a thicker gauge, for easier processing, and then ring-rolled to provide a thinner gauge film, for cost-effectiveness, and having greater loft and texture, for consumer acceptability, while maintaining appropriate tear resistance. Additional benefits are textured film for easier handling, easier dispensing and easier transverse direction (TD) tear while maintaining machine direction (MD) tear, thicker feeling film, easier production due to extruding thicker film, increased output from extrusion lines, and possible polymer blend changes incorporating linear low density polyethylene (LLDPE) and other polyethylene (PE) resins.

These and other advantages and features will be apparent from the following detailed description and the accompanying drawings.

DESCRIPTION

Figure 1:
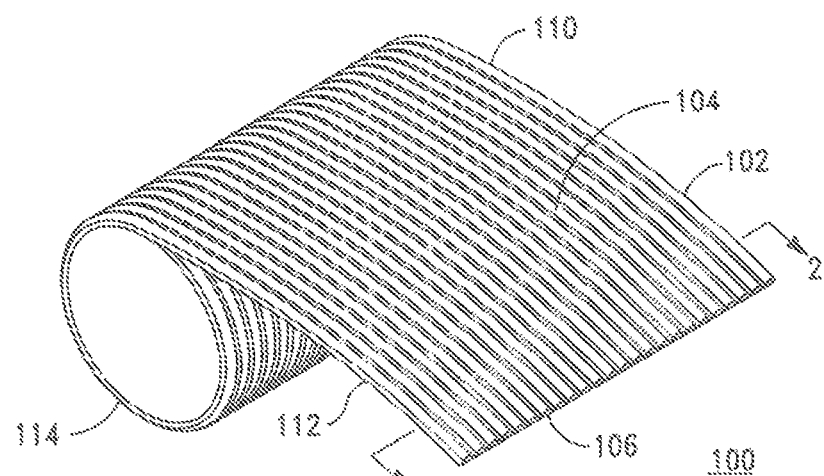
FIG. 1 is a perspective view of a roll of single layer film of the invention.

In one embodiment, the substrate suitably can be produced by a cast film extrusion process or a blown film extrusion process. The cast film process is the most preferred method of producing the substrate because, by this method, it is easier to create the film (i.e., control the film's properties). The property of the substrate that is more easily controlled by the cast film process is the gauge variation, which we understand to mean the thickness of the film as it is measured along the width of the film. That is, we can more easily maintain the gauge variation of the substrate within the preferred thickness ranges using a cast film process (as opposed to the blown extrusion process). Controlling the gauge variation in the substrate during the blown extrusion process can become a particular challenge as the substrate becomes thinner. This is because the degree of variation is fixed and becomes a greater percentage of the width of the object being extruded as the object becomes thinner. The cast film process for producing the substrate is also preferred because, as the substrate is produced and wound up at the end of the line, it is easier to control the tension of the wound substrate, and hence, the degree of blocking that might occur. The lower gauge variation of the cast-film-produced substrate also improves web handling during the coating process and reduces wrinkles in the mill roll. (Mill rolls with excessive wrinkles cannot be easily separated or "slit" down into master rolls. Master rolls have the same width as consumer rolls but significantly more linear feet). The blown film extrusion process may be preferred for the consumer preferred balance of tear properties.

The film substrate can be made of any flexible polymer as long as it satisfies the Food and Drug Administration (FDA) direct food contact regulations or similar regulations issued in other countries (i.e., it is a "food grade substrate"). The film substrate can consist of one or more layers. In a suitable embodiment, the film comprises linear low density polyethylene (LLDPE) or mixtures of low density polyethylene (LDPE) and LLDPE. LLDPE and ultra linear low density polyethylene (ULDPE) (ULDPE is sometimes also known as very low density linear low density polyethylene, or VLDPE) typically have a density from about 0.87 grams/cubic centimeter ($g/cm^3$) to about 0.94 $g/cm^3$, while linear high density polyethylene (HDPE) has a density from about 0.941 $g/cm^3$ to about 0.965 $g/cm^3$ (i.e., ethylene homopolymer). (as measured according to ASTM D-92) The term "linear polyethylene" used herein means that the linear polyethylene can be either ULDPE or LLDPE, or mixtures of one or more of each of these. The density of the LDPE for use in the present invention is generally from about 0.9 $g/cm^3$ to about 0.93 $g/cm^3$, preferably from about 0.915 $g/cm^3$ to about 0.925 $g/cm^3$.

In suitable embodiments, the film substrate can be made of modified polyolefins. High modulus materials such as polypropylene, high density polyethylene (HDPE), polyvinylidene vinyl chloride (PVDC or "Saran"), and polyvinyl chloride can comprise one of the layers of the substrate. A high modulus material reduces the tendency for the film to tangle, and tends to correlate with easy tearing of the film, making it easy to cut and dispense. Toughening materials such as low density polyethylene (LDPE), linear low density polyethylene (LLDPE), blends of LDPE and LLDPE, and ethylene vinyl acetate (EVA) can comprise another layer of the substrate. A toughening material prevents the film from tearing or splitting when trying to handle the material and, for example, unwrap the film from a container or object. It is believed that a layer of EVA, ethylene acrylic acid (EAA) or ethylene methacrylic acid (EMA) also helps film stick to food or containers. In a suitable embodiment, the film substrate comprises co-extruded HDPE and LDPE, or co-extruded HDPE, LDPE and polypropylene.

Additives such as antioxidants (e.g., Irgafos™ 168 (a phosphite) and Irganox™ 1010 (a hindered phenolic) both made by Ciba-Geigy Corporation), cling additives (e.g., polyisobutylene (PIB), ethylene vinyl acetate (EVA), amorphous polypropylene, polyterpene, sorbitan monooleate, glycerol monooleate, and microcrystalline wax), antiblock additives, pigments, and the like can also be included in the film substrate.

The total gauge of the substrate is between about 0.3 mils and about 1.5 mils, suitably between about 0.3 mils and about 0.9 mils, and most suitably between about 0.3 mils and about 0.6 mils. As used in this patent application, a "mil" is a unit of length, equal to 0.001 inch, or to $2.54 \times 10^{-5}$ meter. Furthermore, it is preferable for the substrate to have certain Elmendorf tear properties and 2% secant modulus properties, and for the polymers, polymer blends or coextrusions used to manufacture the substrate to be selected accordingly. In the transverse direction of the film, the Elmendorf tear property is a measure of how easy it will be to dispense a film by cutting it (e.g., with a cutter bar), and in the machine direction the Elmendorf tear property is a measure of how easy it will be for a film to avoid splitting. In the transverse direction (TD) of the substrate, preferably the degree of tearing will be between about 40 grams/mil and about 200 grams/mil, more suitably between about 40 grams/mil and about 150 grams/mil, and most suitably between about 40 grams/mil and about 100 grams/mil. In the machine direction (MD) of the substrate, preferably the degree of tearing will be between about 60 grams/mil and about 300 grams/mil, more suitably between about 60 grams/mil and about 300 grams/mil, and most suitably between about 100 grams/mil and about 200 grams/mil. The TD tear is preferably less than or equal to 50% of the MD tear.

In one embodiment, the food grade wrap film can additionally comprise a release coating disposed on the surface of the substrate. This additional release coating can provide further protection to the food grade wrap film against the film blocking (i.e., sticking to itself) to facilitate the unwinding of the film by consumers. This release-coating is also helpful during the manufacture of the film since it facilitates the slitting process, namely, the process by which a mill roll is reduced (or separated) into multiple master rolls. This release coating can be made of silicones or carbamates, for example, as long as the substance used conforms with the FDA direct food contact regulations or similar regulations in other countries (i.e., it is a food grade release coating). Suitably, this release coating can comprise a fluorinated copolymer delivered from a water and alcohol blend (e.g., perfluoroalkyl phosphate (also known as Mayzo RA-120W available from Mayzo, Inc.)). Alternatively, this release coating can comprise an aqueous silicone, an ultraviolet-cured solventless silicone material, or an electron-beam-cured solventless silicone material. The coating is preferably applied using a direct gravure process using a chrome plated anilox roll, in a dry weight of between about 0.1 grams per square meter and about 0.5 grams per square meter. It is suitably dried at about 180 F.±20 F. Alternatively, release agents can be added directly to the substrate during film extrusion. The following release agents could be used in this alternative embodiment, by way of example: diatomaceous earth, precipitated silica, amorphous silica, fatty amides, ceramic spheres, calcium carbonate and talc. In yet another embodiment, the food grade wrap film can contain a pigmented substrate, a pigmented adhesive and/or a pigmented overprinted release. In yet another embodiment, a logo can be printed onto the film. It is suitable that, if both a release coating and a logo are to be applied to the film, then the logo should be printed first and the release coating should be applied thereafter to the surface of the substrate. Alternatively, the logo can be incorporated into the pattern of the overprinted release which would alleviate the additional step of printing a logo onto the film. The logo can assist consumers in identifying the manufacturing source of the film.

Referring to FIG. 1, there is illustrated a roll 100 of thermoplastic film 102 which may be used as a cling wrap film. The film 102 may include a ribbed pattern 104 formed or disposed therein. In the illustrated embodiment, the ribbed pattern 104 may show ribs parallel with each other and perpendicular to the top edge 106 of the film roll 100. The ribbed pattern 104 may show equally spaced ribs that parallel the width of the film 102 between the first and second side edges 110, 112 across the entire width of the film 102 from side edge 110 to side edge 112. In other embodiments, the ribbed pattern 104 may show ribs unequally spaced apart from each other. The ribbed pattern 104 may have a length commensurate with the length of the film 102. The roll 100 may be on a paper core 114.

Figure 2:
FIG. 2 is a cross-sectional view of the film taken along line 2-2 of FIG. 1 illustrating the ribs.
Figure 3:
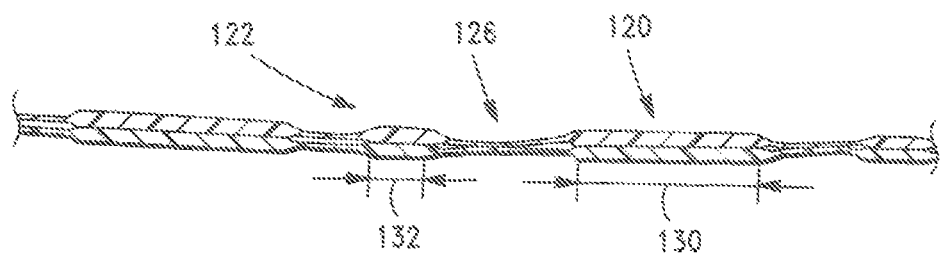
FIG. 3 is a cross-section photomicrograph view of a 2 layer film embodiment similar to the cross sectional view of FIG. 2.

Referring to FIG. 2, a cross section 108 of the ribbed pattern 104 is illustrated. The ribbed pattern 104 is defined by alternating thick and thin regions The cross section 108 may take the form of a plurality of alternating linear ribs 120 and 122 that may be parallel and adjacent to one another such that the thermoplastic material of the film 102 may have a general shape of alternating ribs 120, 122 where ribs 120 have a different shape from ribs 122. As shown in FIG. 2 and the drawing of FIG. 3, the cross section 108 consists of alternating linear ribs 120 and 122 separated by thin sections 126. The alternate 2 layer film embodiment of FIG. 3 shows a drawing of a photomicrograph and 80× magnification showing alternating linear ribs 120 and 122 separated by thin sections 126. Depending upon the processing conditions, the width 130 of the ribs 120 and the width 132 of the ribs 122 can and will vary. However, the width 130 is generally greater than the width 132, and the width 130 may be more than twice the width 132, as shown in FIG. 3.

Figure 4:
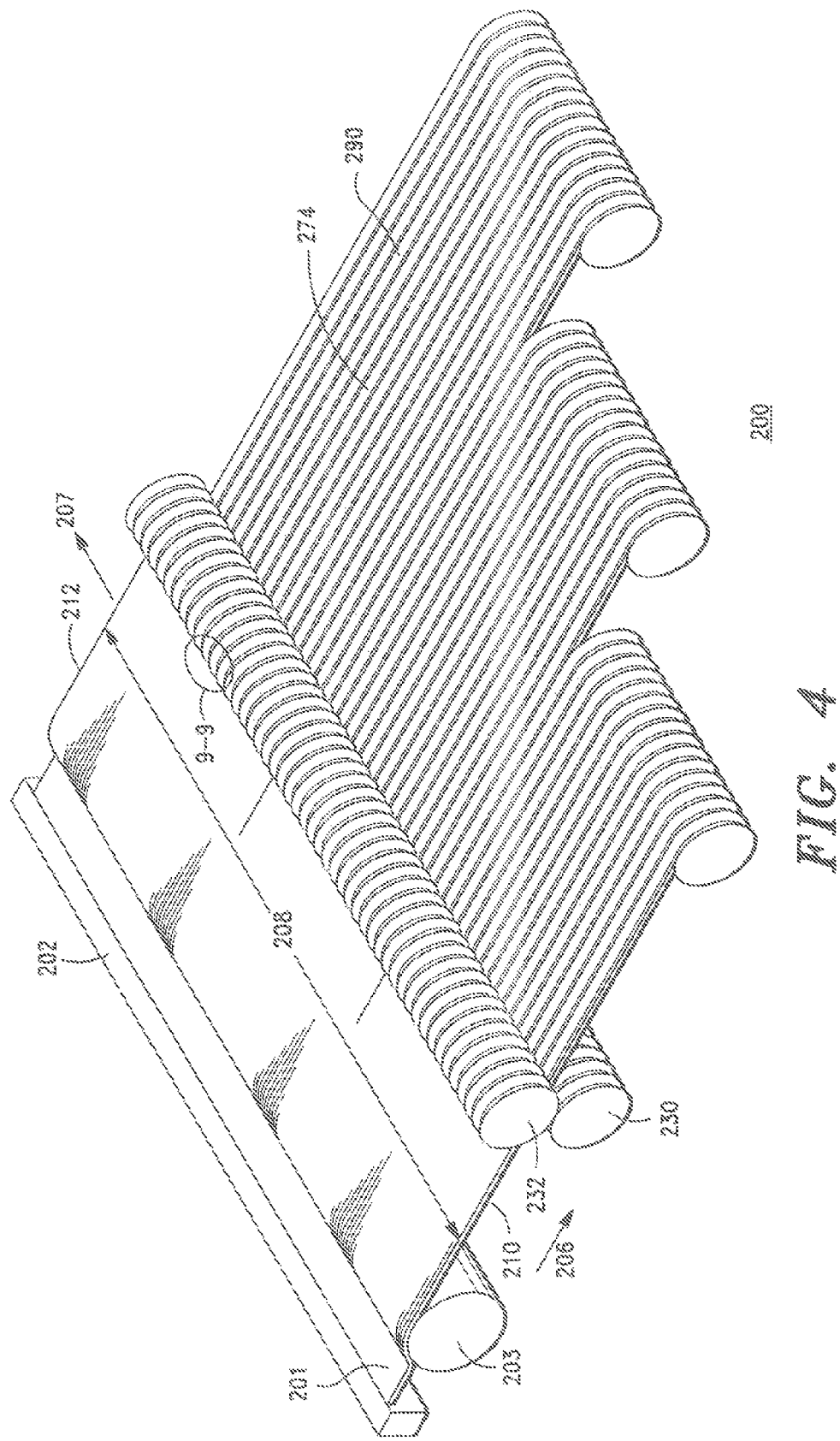
FIG. 4 is a schematic representation of a high speed manufacturing process for producing thermoplastic film with ribs from a web of thermoplastic material including first and second rollers between which the web is directed.

To produce a film having ribs as described herein, there is schematically illustrated in FIG. 4 a high speed manufacturing process 200 that may process continuous thermoplastic webs into the finished ribbed cling wrap. The web 201 may be initially provided by a process device 202, for example a blown film or cast film extruder. The web 201 goes from the extruder 202 onto a master roll 203. The master roll 203 is unwound and directed along a machine direction 206 by the processing equipment. The web 201 may have an initial width 208 between a first edge 210 and a second edge 212 of the web. The web 201 is slit and fed into a first cylindrical roller 230 and an adjacent second cylindrical roller 232 between which the web 201 may be directed by the processing equipment. The first and second rollers 230, 232 may be arranged so that their longitudinal axes are in the transverse direction 207, perpendicular to the machine direction 206 and may be adapted to rotate about their longitudinal axes in opposite rotational directions. In various embodiments, motors may be provided that power rotation of the rollers 230, 232 in a controlled manner. The first and second rollers 230, 232 may be made from any suitable material including, for example, metal, such as, steel or titanium.

The rollers 230, 232 may have ridges on the rollers which may impart the ribs into the web. After the web 201 has passed between the first and second rollers 230, 232, the web includes a continuous ribbed pattern 274. Because the web 201 is stretched by the process of passing through the rollers 230, 232, the web increases in width and the gauge of the web is reduced. The web of ribbed film 290 may be wound up into a roll 292 for packaging and distribution. For example, the roll 292 may be cut and placed into a carton (FIGS. 7A and 7B) or bag for sale to a customer. The parallel ribbed pattern 274 may run the entire TD length 207 of the web 201.

Figure 5:
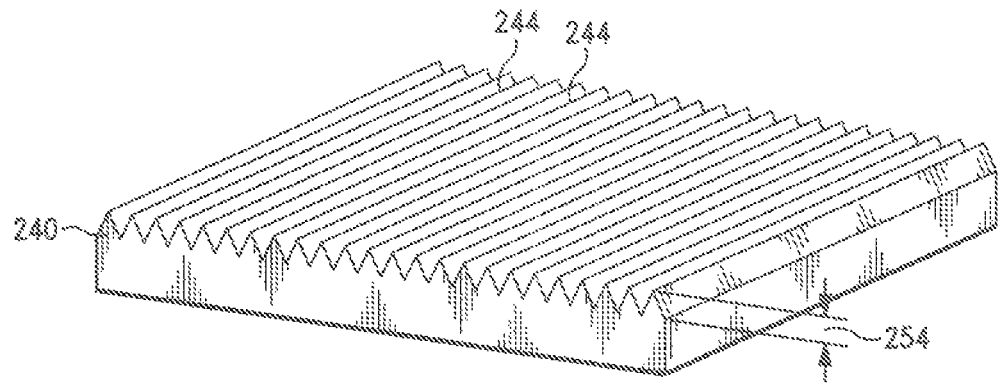
FIG. 5 is a perspective view of the surface of the rollers used to form the ribs in the web during the process of FIG. 4.

Referring to FIG. 5, there is illustrated the surface 240 of the rollers 230. The first surface 240 may include a plurality of teeth or ridges 244 that protrude outward from the roller. Each of the ridges 244 may be parallel to each other and may extend radially about the surface of the roller. Multiple ridges may be spaced along the axial length of the roller. The rollers 230 are placed adjacent to each other and rotated in opposite directions. Each of the ridges 244 may be in the shape of an inverted V.

By way of example, the height 254 may have a first range from about 0.02 inches (0.05 cm) to about 0.4 inches (1.02 cm), a second range from about 0.04 inches (0.1 cm) to about 0.2 inches (0.51 cm), and a third range from about 0.06 inches (0.15 cm) to about 0.15 inches (0.38 cm). In one embodiment, the height 254 may be about 0.08 inches (0.2 cm). To form the desired shape on the cylindrical rollers, the rollers may be cast, ground or etched as appropriate.

Figure 6:
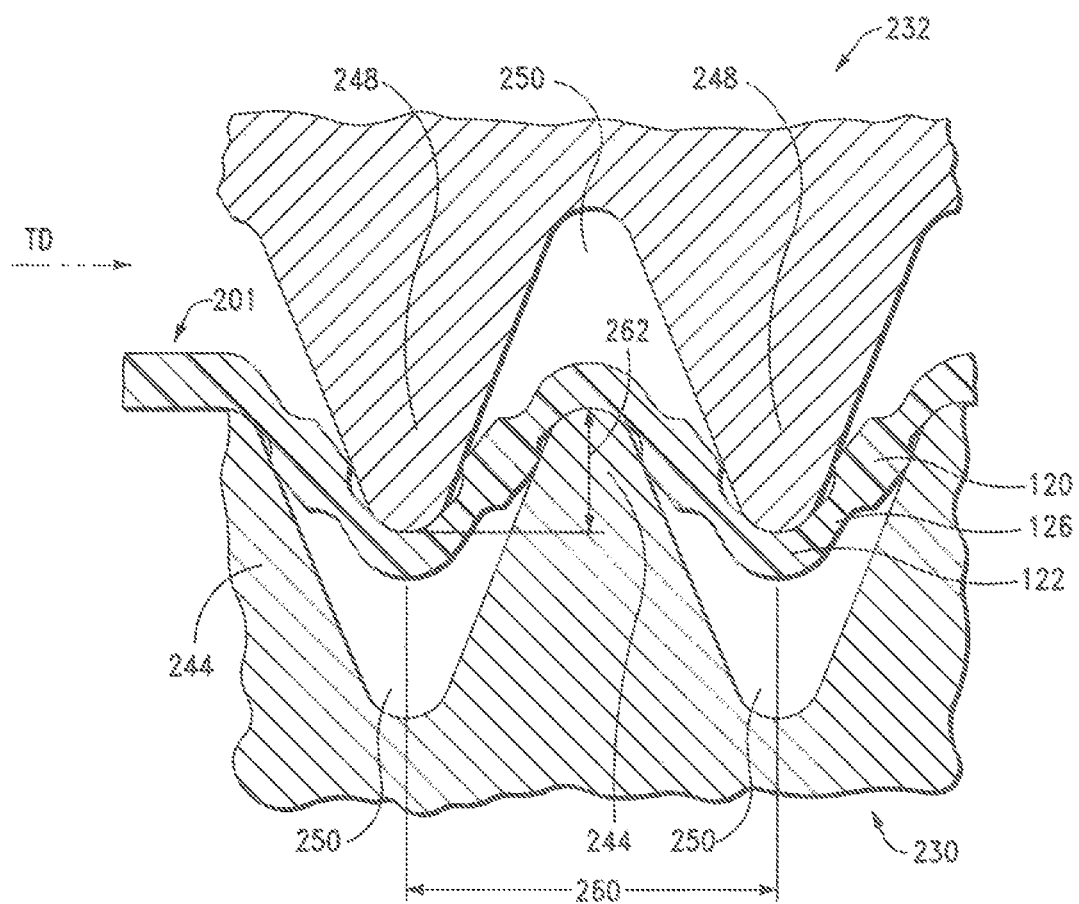
FIG. 6 is a view of the area indicated by circle 9-9 of FIG. 4 illustrating the interaction of the ridges on the rollers and a web being directed therebetween.

Referring to FIG. 6, there is illustrated the interaction between the rotating first and second rollers 230, 232 as the web 201 is directed therebetween. To facilitate cooperation between the first and second rollers, the pattern of ridges 244 on the first roller 230 may be axially offset with respect to the pattern of ridges 248 on the second roller 232 so that the ridges of each roller can be received in and accommodated by the grooves formed between the ridges of the opposing roller. In the illustrated embodiment, the second ridges 248 have the same shape and size along the surface of the roller. In another embodiment, the second ridges 248 may have shapes and sizes complementary or converse to that of the ridges 244 on the first roller 230. Referring to FIG. 6, as the web 201 is directed between the rollers, the ridges 244 on the first roller 230 displace the web material between the ridges 248 on the second roller 232. To facilitate displacement of the web between the ridges of the rollers, the rollers may be pressed or forced together, for example, by hydraulic equipment or other equipment, such as, hydraulic actuators. The pressure at which the rollers are pressed together may be in a first range from about 30 PSI (2.04 atm) to about 100 PSI (6.8 atm), a second range from about 60 PSI (4.08 atm) to about 90 PSI (6.12 atm), and a third range from about 75 PSI (5.10 atm) to about 85 PSI (5.78 atm). In one embodiment, the pressure may be about 80 PSI (5.44 atm).

The first ridges 244 on the first roller 230 and the second ridges 248 on the second roller 232 may have a depth of engagement 262. By way of example, the depth of engagement 262 may have a first range from about 0.010 inches (0.025 cm) to about 0.080 inches (0.203 cm), a second range from about 0.02 inches (0.05 cm) to about 0.070 inches (0.178 cm), and a third range from about 0.030 inches (0.076 cm) to about 0.060 inches (0.152 cm). In one embodiment, the depth of engagement 260 may be about 0.055 inches (0.140 cm). The first ridges 244 may have a peak to peak spacing or pitch 241. The pitch 241 may have a first range from about 0.02 inches (0.05 cm) to about 0.20 inches (0.51 cm), a second range from about 0.03 inches (0.07 cm) to about 0.10 inches (0.25 cm), and a third range from about 0.035 inches (0.089 cm) to about 0.075 inches (0.191 cm). In one embodiment, the pitch 241 may be about 0.040 inches (0.102 cm).

As the web 201 is advanced between the rollers 230, 232 that are rotating in opposite rotational directions, cooperation between the ridges 244, 248 may deform the web into a ribbed pattern conforming to the ridges, as illustrated in FIG. 6. As the first ridges 244 are received between the second ridges 248, the web material 201 may stretch out approximately commensurate with the depth of engagement 262. In an embodiment, the stretching of the web 201 may impart or form a ribbed appearance to the web that corresponds to the ribs 120, 122 and thin sections 126. In a further embodiment, the stretching of the web material may allow the web to grow or extend longitudinally. As illustrated in FIG. 4, the web 201 may engage one or more nip rollers 272 which may pull on the web 201 and may cause the first ribs 122 to spread open or flatten. The nip rollers 272 may be at an angle 273 to the machine direction 206. The angle 273 may have a first range from about 0 degrees to about 45 degrees, a second range from about 5 degrees to about 30 degrees, and a third range from about 10 degrees to about 20 degrees. In one embodiment, the angle 273 may be about 15 degrees. The web 201 may be wider after passing between the nip rollers 272, as indicated by width 270.

Figure 7A:
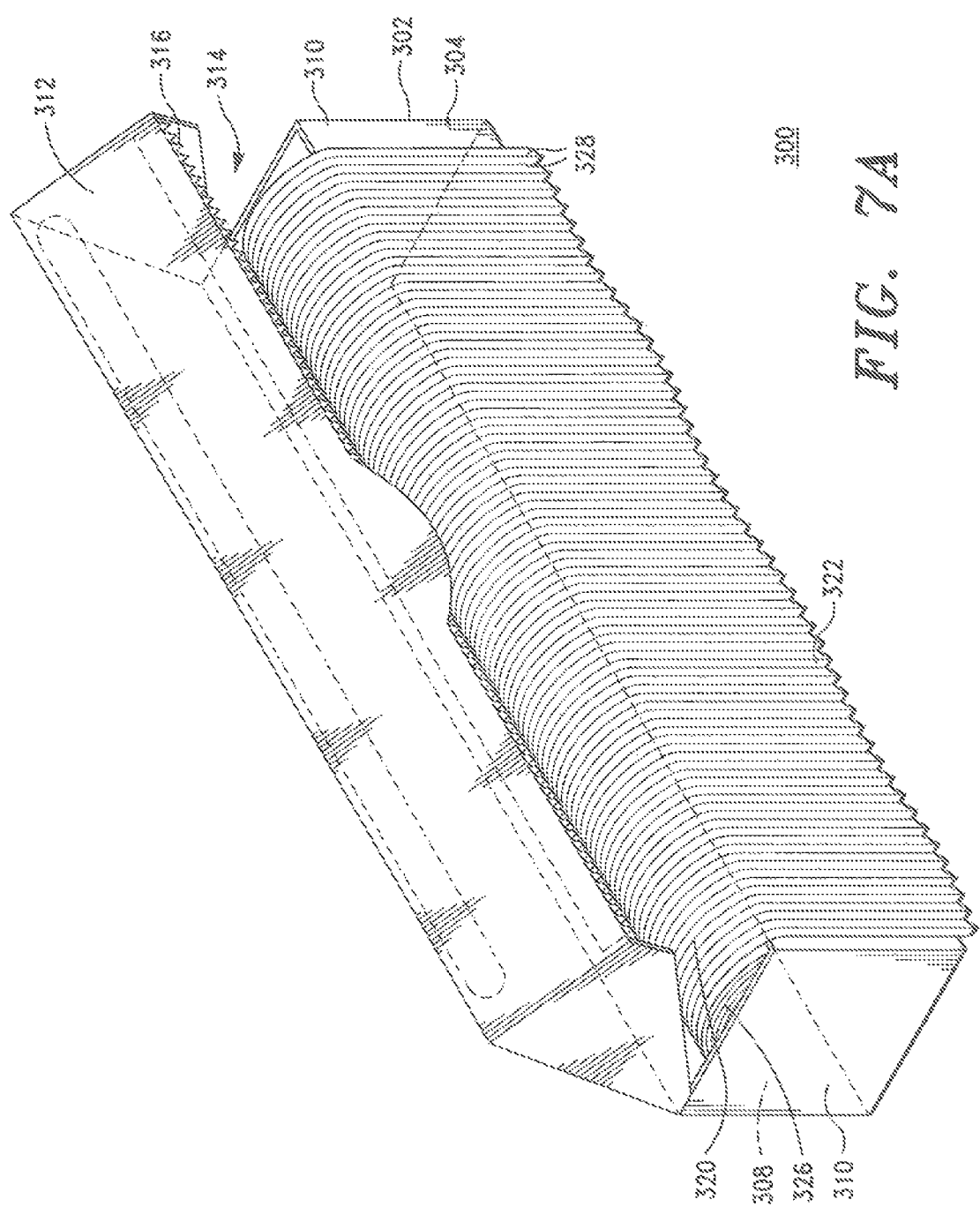
FIG. 7A is a perspective view of the ribbed film being withdrawn from a carton.
Figure 7B:
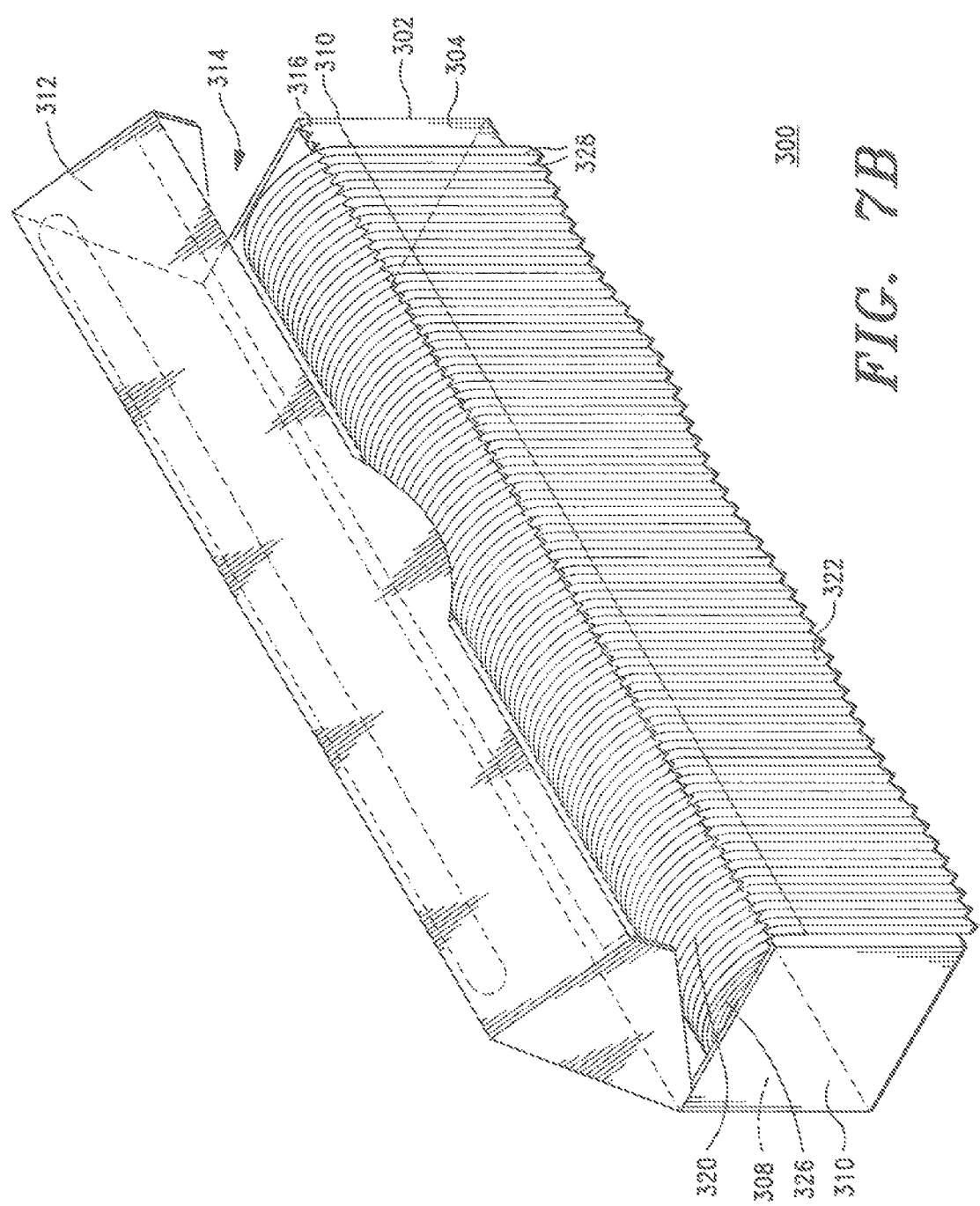
FIG. 7B is a perspective view of the ribbed film being withdrawn from a carton.

Referring to FIG. 7A, the dispensing container 300 comprises a carton 302 having a front panel 304, a bottom panel 306, a back panel 308, two side panels 310 and a lid 312, the carton 302 having a lengthwise opening 314 and a lengthwise cutting strip 316 on the lid 312. The carton 302 contains a roll 320 of thermoplastic food wrap film 322. The film 322 has a width 324 and a length extending around a paper core 326. The roll 320 of film 322 on the paper core 326 has a plurality of ribs 328 parallel to one another along the length of the film 322. When the film 322 is removed from the carton 302, the parallel ribs 328 are in perpendicular alignment with the cutting strip 316. Referring to FIG. 7B, the dispensing container 300 comprises a carton 302 having a front panel 304, a bottom panel 306, a back panel 308, two side panels 310 and a lid 312, the carton 302 having a lengthwise opening 314 and a lengthwise cutting strip 316 on the front panel 304. The carton 302 contains a roll 320 of thermoplastic food wrap film 322. The film 322 has a width 324 and a length extending around a paper core 326. The roll 320 of film 322 on the paper core 326 has a plurality of ribs 328 parallel to one another along the length of the film 322. When the film 322 is removed from the carton 302, the parallel ribs 328 are in perpendicular alignment with the cutting strip 316.

Because the surface area of the web material is increased, it will be appreciated that more film can be made from the web material than prior to rolling. Thus, one possible result of rolling the web material is the cost savings benefit that the process provides. Another possible result of stretching the web out via the interacting rollers is that the molecules of the thermoplastic material may realign or re-orientate themselves. This may result in the web material corresponding to the first rib becoming stronger compared to the same thickness of a web material which was not stretched via the rollers.

EXPERIMENTAL

Reduction of TD Tear

Three films were produced and compared for MD Tear and TD Tear. Film A was a cast film of LDPE and 0.45 mil gauge. Film B was a blown film of LDPE and 0.45 mil gauge. Film C was a blown of LLDPE of 0.9 mil gauge that was ring rolled down to 0.54 mil gauge with 0.055 inches (0.140 cm) depth of engagement. Standard 0.9 mil LLDPE blown film has a MD tear of 320 g and a TD tear of 820 g. The gauge of a textured film can be measured based on the density and weight of the film. In a suitable embodiment of the invention, the ratio of MD Tear to TD Tear is greater than or equal to 1.0, or greater than or equal to 2.0, or greater than or equal to 2.5. As can be seen be the table below, the ring rolling process allows the extrusion of a higher gauge LLDPE film, while achieving a suitable MD Tear to TD Tear ratio after down gauging by the ring roll process. A suitable MD Tear to TD Tear ration is critical for proper consumer handling and tearing off on the cutter bar. Note that for example C, after the ring roll process the TD Tear is less than 100 grams.

Tear Resistance Comparison of Different Extrusion Processes (in grams)

| A - Cast Film | | B - Blown Film | | C - Blown Ring Rolled Film | |
|---|---|---|---|---|---|
| MD Tear | TD Tear | MD Tear | TD Tear | MD Tear | TD Tear |
| 98 | 121 | 166 | 68 | 163 | 65 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those embodiments may become apparent to those of ordinary skill in the art upon reading the foregoing description. The inventor(s) expect skilled artisans to employ such variations as appropriate, and the inventor(s) intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A container and cling wrap comprising:
an oblong carton having a lengthwise opening and a lengthwise cutting strip; and
a roll of a continuous thermoplastic food wrap film on a paper core, the continuous thermoplastic film having a width along the lengthwise opening of the carton and a film length perpendicular to the film width, the continuous thermoplastic film comprising a plurality of parallel ribs extending along film length,
wherein the ribs define a pattern of alternating thick and thin regions, the thick regions including a first set of ribs with a first uniform cross-sectional shape and a second set of ribs with a second uniform cross-sectional shape, the first uniform cross-sectional shape differing from the second uniform cross-sectional shape in one or more of width or thickness;
wherein the ribs of the first set of ribs alternate with the ribs of the second set of ribs and are separated by the thin regions
wherein a center of each of the ribs of the first set of ribs and the second set of ribs are aligned with centers of the thin regions such that the first set of ribs and the second set of ribs are present on both a front side and a back side of the continuous thermoplastic film; and wherein the continuous thermoplastic film is dispensed through the lengthwise opening and is cut by the lengthwise cutting strip.

2. The container and cling wrap of claim 1, wherein the ribs of the first and second sets of ribs extend across the entire film width and each rib of the first and second sets of ribs extends along the entire film length.

3. The container and cling wrap of claim 1, wherein the continuous thermoplastic film has a front side and a back side and the ribs of the first and second sets of ribs extend from both the front side and the back side.

4. The container and cling wrap of claim 1, wherein the continuous thermoplastic film has a ratio of machine direction tear to transverse direction tear of greater than 1.0.

5. The container and cling wrap of claim 1, wherein the continuous thermoplastic film has a ratio of machine direction tear to transverse direction tear of greater than 2.0.

6. The container and cling wrap of claim 1, wherein the continuous thermoplastic film comprises linear low density polyethylene.

7. The container and cling wrap of claim 1, wherein the height of the ribs is substantially equal to a starting gage of the continuous thermoplastic film prior to being formed with the ribs.

8. The container and cling wrap of claim 1, wherein ribs of the first set of ribs have a width that is greater than a width of the ribs of the second set of ribs.

9. The container and cling wrap of claim 1, wherein the width of the ribs of the first set of ribs is more than twice the width of the ribs of the second set of ribs.

10. The container and cling wrap of claim 1, wherein the continuous thermoplastic film is incrementally stretched.

11. A container and cling wrap comprising:
an oblong carton having a lengthwise opening and a lengthwise cutting strip; and
a roll of continuous thermoplastic food wrap film on a paper core, the continuous thermoplastic film having a width along the lengthwise opening of the carton and a film length perpendicular to the film width, the continuous thermoplastic film comprising a pattern of a plurality of parallel ribs extending along the film length,
wherein the pattern extends across the entire film width,
wherein the pattern of the plurality of parallel ribs comprises alternating thick and thin regions, the thick regions including a first set of ribs with a first cross-sectional shape and a second set of ribs with a second cross-sectional shape, the first cross-sectional shape differing from the second cross-sectional shape in one or more of width or thickness;
wherein each rib of the first and second sets of ribs extends along along the entire film length; wherein the first set and the second set of ribs are separated by the thin regions; wherein the continuous thermoplastic film has a front side and a back side and the first ribs and second ribs extend from both the front side and back side; and wherein the continuous thermoplastic film is dispensed through the lengthwise opening and is cut by the lengthwise cutting strip.

12. The container and cling wrap of claim 11, wherein ribs of the first set of ribs have a width that is greater than a width of the ribs of the second set of ribs.

13. The container and cling wrap of claim 11, wherein the cutting strip is attached to the front panel.

14. The container and cling wrap of claim 11, wherein the cutting strip is attached to the lid.

15. The container and cling wrap of claim 11, wherein the continuous thermoplastic film has a ratio of machine direction tear to transverse direction tear of greater than 2.0.

16. The container and cling wrap of claim 11, wherein the height of the ribs is substantially equal to a starting gage of the continuous thermoplastic film prior to being formed with the ribs.

17. The container and cling wrap of claim 11, wherein the continuous thermoplastic film is produced by cast film extrusion.

18. The container and cling wrap of claim 11, wherein the continuous thermoplastic film is produced by blown film extrusion.

19. The container and cling wrap of claim 11, wherein the continuous thermoplastic film is incrementally stretched.

20. The container and cling wrap of claim 12, wherein the width of the ribs of the first set of ribs is more than twice the width of the ribs of the second set of ribs.

* * * * *